United States Patent
Miette et al.

(10) Patent No.: US 10,758,944 B2
(45) Date of Patent: Sep. 1, 2020

(54) EQUIPMENT FOR HANDLING PARCELS USING SHUTTLE ROBOTS THAT MOVE BAGS OR THE LIKE

(71) Applicant: SOLYSTIC, Bagneux (FR)

(72) Inventors: Emmanuel Miette, Saint Gratien (FR); Luc Chirol, Paris (FR)

(73) Assignee: Solystic (FR)

( * ) Notice: Subject to any disclaimer, the term of this patent is extended or adjusted under 35 U.S.C. 154(b) by 340 days.

(21) Appl. No.: 15/750,600

(22) PCT Filed: Nov. 3, 2017

(86) PCT No.: PCT/FR2017/053016
§ 371 (c)(1),
(2) Date: Feb. 6, 2018

(87) PCT Pub. No.: WO2018/115608
PCT Pub. Date: Jun. 28, 2018

(65) Prior Publication Data
US 2020/0086351 A1    Mar. 19, 2020

(30) Foreign Application Priority Data
Dec. 23, 2016    (FR) ...................................... 16 63304

(51) Int. Cl.
*B07C 3/08*    (2006.01)
*B07C 3/02*    (2006.01)
(Continued)

(52) U.S. Cl.
CPC .............. *B07C 3/087* (2013.01); *B07C 3/008* (2013.01); *B07C 3/02* (2013.01); *B65G 37/02* (2013.01);
(Continued)

(58) Field of Classification Search
CPC .... B07C 3/02; B07C 3/06; B07C 3/08; B07C 3/087; B65G 37/02; B65G 47/44; B65G 47/46–506; B65G 47/96–965
See application file for complete search history.

(56) References Cited

U.S. PATENT DOCUMENTS 4,801,000 A * 1/1989 Canziani ................ B65G 47/49
                                               198/370.06
9,486,838 B2 * 11/2016 Miette ....................... B07C 3/02
(Continued)

FOREIGN PATENT DOCUMENTS

FR          3 027 140 A1      4/2016
WO       2014/057182 A1    4/2014

*Primary Examiner* — Gene O Crawford
*Assistant Examiner* — Keith R Campbell
(74) *Attorney, Agent, or Firm* — Ware, Fressola, Maguire & Barber LLP

(57) ABSTRACT

Equipment for handling parcels between loading points at which said parcels are loaded and drop-off points at which the parcels are dropped off in a logistics center, the equipment having sorting receptacles placed at the loading points and into which the parcels are poured loosely in bulk, further having trolleys, each of which is configured to carry a removable receptacle, and shuttle robots configured to dock with the trolleys and to move them automatically, and a monitoring and control unit for automatically and remotely controlling the movement of the shuttle robots as a function of a sorting plan so as to place trolleys with empty receptacles at the loading points and so as to place each of the trolleys with a receptacle loaded with parcels at a drop-off point where the receptacle loaded with parcels is replaced with an empty receptacle.

6 Claims, 2 Drawing Sheets

(51) Int. Cl.
*B65G 37/02* (2006.01)
*B07C 3/00* (2006.01)
*B65G 47/46* (2006.01)

(52) U.S. Cl.
CPC ...... *B65G 47/46* (2013.01); *B65G 2201/0285* (2013.01)

(56) References Cited

U.S. PATENT DOCUMENTS

| | | | |
|---|---|---|---|
| 9,855,586 B2* | 1/2018 | Chirol | B07C 3/02 |
| 9,981,291 B2* | 5/2018 | Chirol | B07C 3/008 |
| 2015/0235165 A1* | 8/2015 | Miette | G06Q 10/083 |
| | | | 705/337 |
| 2018/0333750 A1* | 11/2018 | Miette | B07C 3/02 |

* cited by examiner

EQUIPMENT FOR HANDLING PARCELS USING SHUTTLE ROBOTS THAT MOVE BAGS OR THE LIKE

CROSS REFERENCE TO RELATED APPLICATIONS

This application is the U.S. National Stage of International Application Number PCT/FR2017/053016 filed on Nov. 3, 2017, which application claims priority under 35 USC § 119 to French Patent Application No. 1663304 filed on Dec. 23, 2016. Both applications are hereby incorporated by reference in their entirety.

TECHNICAL FIELD

The invention relates to the field of parcel-handling logistics centers in which, after being received and sorted into bins or trays, the parcels are routed to consolidation or transport platforms.

PRIOR ART

Certain parcel-handling logistics centers have an automated sorting conveyor that can be controlled by a monitoring and control unit to move the parcels in series past outlets.

The monitoring and control unit then directs each parcel towards a certain sorting outlet chosen as a function of sorting information that is associated with the parcel and that has been detected upstream on the conveyor.

Sorting bins of the removable type are disposed under the sorting outlets to receive the parcels poured into them loosely in bulk.

Operatives in charge of handling the parcels then manually retrieve the bins filled with parcels in order to transfer the parcels into bags.

Each bag is then moved by an operative to a drop-off point, e.g. a platform for bag consolidation, i.e. for grouping the bags together, or a platform for packaging the bags for transport by truck, such handling being arduous when the bags are heavy and bulky.

Robotized means exist for moving such bins, as described in Document WO 2014/057182, but such means are not adapted for optimized handling of the parcels.

SUMMARY OF THE INVENTION

An object of the invention is therefore to remedy those various drawbacks.

In particular, the invention provides equipment for handling parcels between loading points at which said parcels are loaded and drop-off points at which said parcels are dropped off in a logistics center, said equipment comprising trolleys, each of which is designed to carry a removable receptacle, and at least one shuttle robot designed to dock with any one of said trolleys and to move it automatically, said equipment further comprising a monitoring and control unit designed for automatically and remotely controlling the movement of said shuttle robot as a function of a sorting plan, said equipment being characterized in that it further comprises sorting receptacles placed at said loading points and into which said parcels are poured loosely in bulk as a function of sorting indications associated with said loading points, and in that the monitoring and control unit is designed to control the movement of said shuttle robot in such a manner as to place at said loading points trolleys with empty receptacles into which the parcels are poured loosely in bulk, and in such a manner as to place each of said trolleys with a receptacle loaded with parcels at a drop-off point where the receptacle loaded with parcels is replaced with an empty receptacle.

The underlying idea of the invention is thus to automate the handling of the parcels directly from a loading point to a drop-off point.

The equipment of the invention obviates the need for the operative to perform the arduous tasks of transferring parcels from a receptacle to a bag, and of moving the bags to drop-off points.

This automation also reduces the risks of a parcel being erroneously routed to the wrong drop-off point.

The equipment of the invention may advantageously have receptacles in the form of bags. Each of the trolleys of the invention then has a horizontal deck on casters and a bag holder overlying the deck of the trolley for suspending the bag that is open at its top.

The invention also provides a logistics center including equipment of the invention for routing parcels between loading points and drop-off points, wherein said loading points are sorting outlets of a sorting conveyor and wherein said drop-off points are parcel consolidation platforms or platforms for packaging parcels for transport.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF EMBODIMENTS

Figure 1:
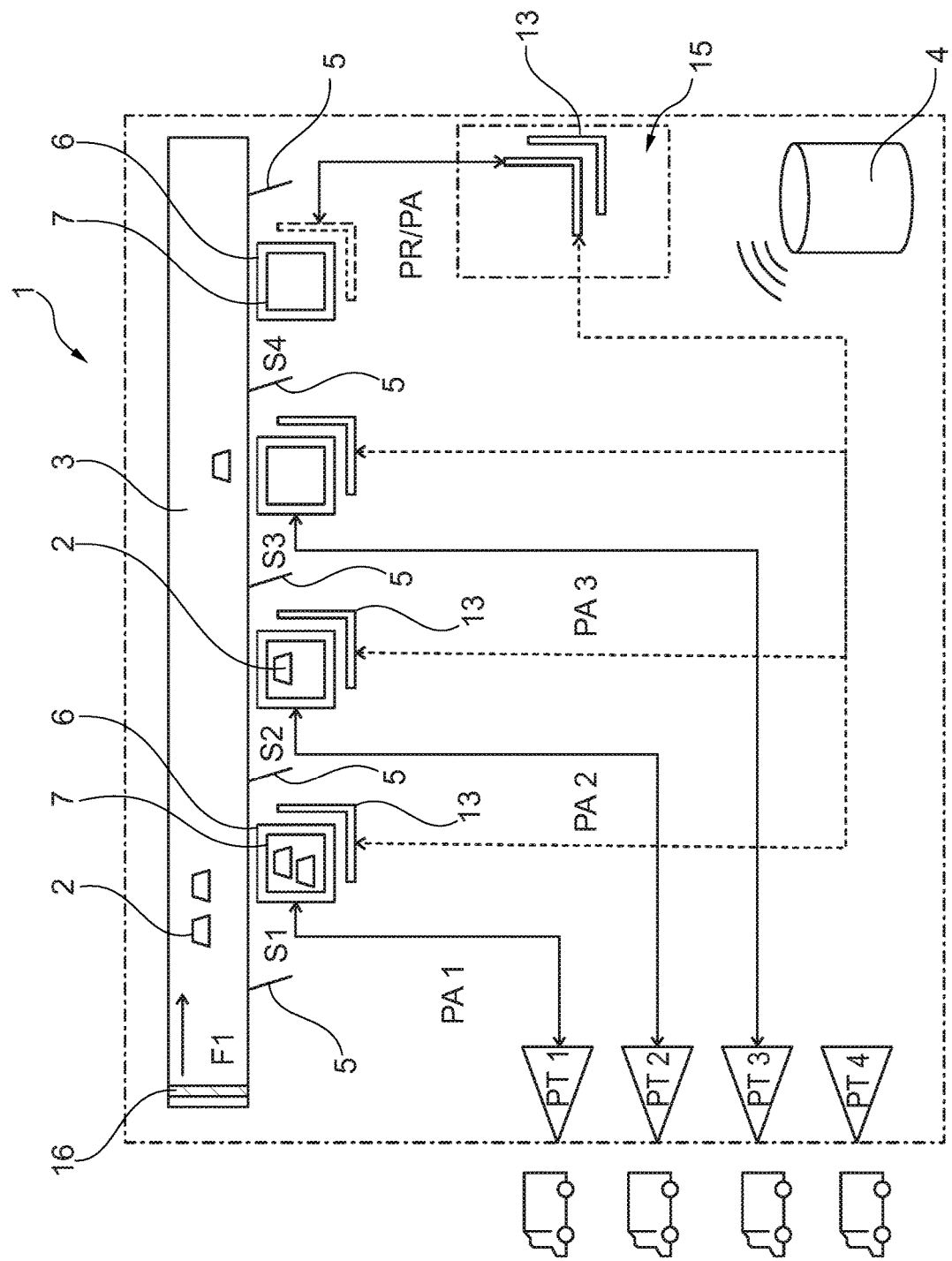
FIG. 1 is a highly diagrammatic view of a logistics center using parcel-routing equipment of the invention.

FIG. 1 is a highly diagrammatic view of the topology of a logistics centre 1 for sorting parcels 2, e.g. a postal sorting centre, with a sorting conveyor 3 and sorting outlets S1, S2, S3, and S4 as well as equipment of the invention for routing the parcels.

Only a small number of sorting outlets S1, S2, S3, S4 are shown out of the tens or indeed hundreds of sorting outlets that the conveyor 3 can serve.

The sorting conveyor 3 is controlled by a monitoring and control unit 4 adapted for automatically recognizing a sorting indication on a parcel 2, such as, for example, a postal destination address when the logistics center is a postal sorting logistics centre. The control unit 4 then causes the conveyor 3 to move the parcel 2 in the conveying direction indicated by the arrow F1 towards the sorting outlet S1, S2, S3, S4 associated with the sorting indication on the basis of a sorting plan recorded in a memory of the unit 4.

Automatic address recognition may be performed, for example from a digital image of the destination address on the parcel 2, which image is taken at the time the parcel is fed onto the sorting conveyor 3.

In this example the sorting conveyor 3 is raised relative to the floor in the logistics center 1, and each sorting outlet S1, S2, S3, S4 is provided with a sorting chute in the form of a ramp 5.

Figure 2:
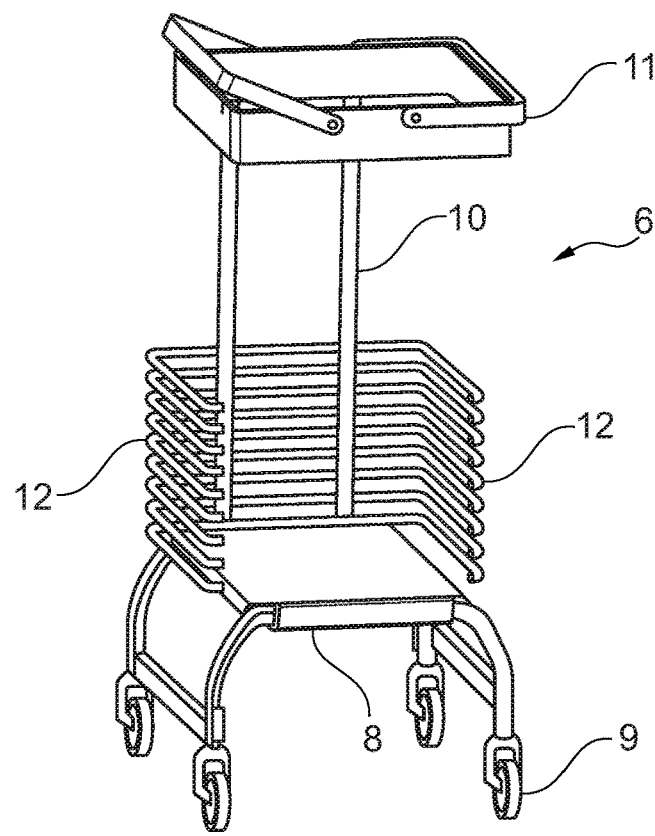
FIG. 2 is a perspective view of a trolley of the invention.

The equipment of the invention for routing the parcels 2 includes trolleys 6, e.g. of the type shown in FIG. 2, adapted to come to be positioned under the sorting outlets S1, S2, S3, S4, etc. at the ramps 5 so as to receive the parcels 2 loosely in bulk directly in the receptacles 7. In this example, each sorting outlet is thus considered to be a loading point at which parcels 2 are loaded and at which a trolley 6 can come to be positioned.

Figure 3:
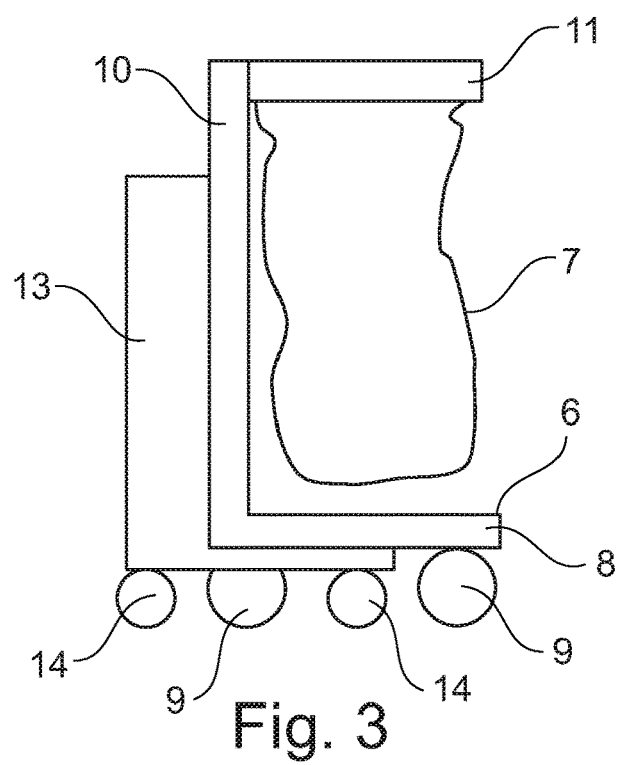
FIG. 3 is a diagrammatic profile view of a shuttle robot docked with a trolley carrying a bag in accordance with the invention.

The term "receptacle" 7 is used to mean any type of container that is capable of storing heterogeneous parcels 2, and that can be mounted on a trolley 6, e.g., as in this example, a bag 7 as shown in FIG. 3.

As can be seen in FIGS. 2 and 3, the trolley 6 of the invention includes a deck 8 that is mounted on casters 9 and from which a vertical wall 10 extends. An annular bag holder 11 also projects substantially perpendicularly from the wall 10 so as to suspend a bag 7 over the deck 8, the bag being open at its top, in the manner of a wall-mounted support for a garbage bag. Side walls 12, visible only in FIG. 2, are adjacent to the vertical wall 10 and make it possible to hold the bag 7 loaded with parcels within the space defined on the floor by the deck 8.

The equipment further includes independent self-propelled shuttle robots 13 that may, as in this example, be mounted on motor-driven wheels 14, and that are suitable for moving along travel paths PA1, PA2, PA3 visible in FIG. 1 and usually followed by the operatives in the logistics center.

Each shuttle robot 13 is thus remotely controlled by the monitoring and control unit 4 as a function of a routing plan for traveling along the travel paths PA1, PA2, PA3 from a respective sorting outlet S1, S2, S3 to a respective drop-off point PT1, PT2, PT3, and, as a function of a return plan, for travelling from the respective drop-off point to the respective loading point.

In this example, the travel paths are the paths normally followed by the sorting operatives.

Each shuttle robot 13 is also designed to dock with a trolley 6, as shown in FIG. 3, in such a manner as to cause it to move as a function of the above-described routing and return plans and also to separate itself from said trolley in such a manner as to leave it where it stands.

Each shuttle robot 13 is also remotely controlled by the monitoring and control unit 4 so as to be moved along defined travel paths PR/PA from a stowage position PR in which the shuttle robot is stationary in a parking place 15 of the logistics center 1 to a docking position PA, in which it is docked with a trolley 6. As shown in FIG. 1, in this example a shuttle robot 13 is controlled by the unit 4 so as to move from the stowage position PR in the parking space 15 to a docking position PA shown in dashed lines at the loading point S4.

The parking space 15 also serves for storing empty trolleys 6. The control unit 4 is also designed to cause the shuttle robots to move the empty trolleys from the parking space 15 to loading points that need trolleys to be present for receiving parcels loosely in bulk.

The equipment of the invention further includes a detector 16 for detecting loading of the parcels in the bags 7. In this example, the detector is disposed on the sorting conveyor 3 but it could equally well be disposed on the trolley or indeed installed at the sorting outlets S1, S2, S3, S4. The information from the detector 16 is retrieved by the monitoring and control unit 4 that automatically and remotely controls the movement of the shuttle robot 13 from one of the sorting outlets S1, S2, S3, S4 to a drop-off point PT1, PT2, PT3, PT4 when a maximum threshold of loading with parcels is reached in the receptacle 7. For example, the detector 16 is used to give information about the weight, size, or shape of the parcel 2, or any other type of physical information about said parcel 2.

For example, the drop-off points (PT1, PT2, PT3, PT4) are parcel consolidation platforms or platforms for packaging the parcels for transport by truck.

The bags loaded with parcels are thus detached from the bag holder 11 so as to be consolidated into groups and/or packaged (closed, labeled etc.).

An operative then hooks an empty bag 7 onto the bag holder 11 and the shuttle robot 13 moves the trolley either to a loading point without a trolley or else to the parking space 15 if no other parcel is scheduled at the appropriate loading point.

What is claimed is:

1. An equipment for handling parcels between loading points at which said parcels are loaded and drop-off points at which said parcels are dropped off in a logistics center, said equipment comprising:
   trolleys, each of the trolleys is configured to carry a removable receptacle,
   at least one shuttle robot configured to dock with any one of said trolleys and to move said trolley automatically, and
   a monitoring and control unit configured to automatically and remotely control the movement of said shuttle robot as a function of a sorting plan,
   wherein said equipment further comprises sorting receptacles placed at said loading points and into which said parcels are poured loosely in bulk as a function of sorting indications associated with said loading points, and wherein the monitoring and control unit is configured to control the movement of said shuttle robot in such a manner as to place at said loading points trolleys with empty receptacles into which the parcels are poured loosely in bulk, and in such a manner as to place each of said trolleys with a receptacle loaded with parcels at a drop-off point where the receptacle loaded with parcels is replaced with an empty receptacle.

2. The equipment according to claim 1, wherein the receptacles are bags, and in that each of the trolleys comprises a horizontal deck on casters and a bag holder overlying the deck of the trolley and designed to suspend a bag.

3. A logistics center including equipment according to claim 2 for routing parcels between the loading points and the drop-off points, wherein said loading points are sorting outlets of a sorting conveyor.

4. The logistics center according to claim 3, wherein said drop-off points are parcel consolidation platforms or platforms for packaging parcels for transport.

5. A logistics center including equipment according to claim 1 for routing parcels between the loading points and the drop-off points, wherein said loading points are sorting outlets of a sorting conveyor.

6. The logistics center according to claim 5, wherein said drop-off points are parcel consolidation platforms or platforms for packaging parcels for transport.

* * * * *